United States Patent [19]

Fadgen, Jr. et al.

[11] 3,874,897

[45] Apr. 1, 1975

[54] ACTIVATOR SOLUTIONS, THEIR PREPARATION AND USE IN ELECTROLESS PLATING OF SURFACES

[75] Inventors: Earl Joseph Fadgen, Jr., Clinton; Edward Basil Saubestre, Hamden, both of Conn.

[73] Assignee: Enthone Incorporated, New Haven, Conn.

[22] Filed: June 25, 1973

[21] Appl. No.: 373,073

Related U.S. Application Data

[60] Division of Ser. No. 171,739, Aug. 13, 1971, Pat. No. 3,767,583, which is a continuation-in-part of Ser. No. 84,500, Oct. 27, 1970, abandoned.

[52] U.S. Cl. .................. 117/47 R, 106/1, 117/47 A, 117/130 E, 117/138.8 R, 117/138.8 B, 117/160 R, 252/794, 252/429

[51] Int. Cl. .............................................. B44D 5/00

[58] Field of Search ............ 117/47 A, 47 R, 130 E, 117/160 R, 138.8 R, 138.8 B; 106/1; 252/79.4, 429 R

[56] References Cited

UNITED STATES PATENTS 3,627,558 12/1971 Rogers et al. .......................... 106/1

*Primary Examiner*—Mayer Weinblatt
*Assistant Examiner*—Bruce M. Hess
*Attorney, Agent, or Firm*—Roger J. Drew; Elwood J. Schaffer

[57] ABSTRACT

Surfaces intended to be electrolessly metal plated are treated with a colloidal catalyst metal-free acid liquid solution of a soluble, Lewis base-modified noble metal-tin halide complex until the surface is rendered catalytic. The noble metal of the complex is a noble metal which is catalytic to the deposition of the metal destined to be electrolessly plated on the surface.

31 Claims, No Drawings

ACTIVATOR SOLUTIONS, THEIR PREPARATION AND USE IN ELECTROLESS PLATING OF SURFACES

CROSS-REFERENCES TO RELATED APPLICATIONS

This is a division of our co-pending U.S. patent application Ser. No. 171,739, now U.S. Pat. No. 3,767,583, application Ser. No. 171,739 being a continuation-in-part of our U.S. Pat. application Ser. No. 84,500, filed Oct. 27, 1970 now abandoned.

BACKGROUND OF THE INVENTION

1. Field of the Invention

This invention relates to electroless metal plating and more particularly to a process for the chemical reduction deposition of metal coatings on surfaces involving a new and improved catalytic activation of the surface or surfaces prior to the chemical reduction metal depostion. Additionally this invention relates to new and improved catalyst solutions which are substantially free of colloidal metal particles, and to a method for preparing the catalyst solutions.

2. Description of the Prior Art

Prior activation systems for electroless metal deposition consisted of separate solutions of a stannous salt, e.g. stannous chloride, and a noble metal salt, e.g. palladous chloride. The stannous salt solution and noble metal salt solution were true solutions, and the activation was a two step process with separate application of the stannous salt solution followed by application of the palladous salt solution with water rinsing between steps. Colloidal tin and colloidal silver-containing baths have also been used as activation systems for electroless metal plating. Combination colloidal catalyst systems of noble metal salts and tin salts have also been used heretofor for activation substrates for electroless metal plating. The colloidal activation or catalyst systems referred to above, although giving good results in certain respects, leave room for improvement from the standpoint of stability of the colloidal catalyst-containing baths and effectiveness in catalyzing the surface or surfaces intended to be electrolessly metal plated. Thus the colloidal activator or catalyst systems have colloidal catalyst particles of such large size that contacting and catalyzing of certain surface or surfaces intended to be electrolessly metal plated tends to be impossible, for example in penetrating, contacting and activating the surfaces of narrow, deep recesses such as those often found in multi-layer printed circuit boards and the surfaces of small holes, especially small blind holes, and crevices encountered in plating other plastics.

U.S. Pat. No. 3,011,920 discloses the use of a liquid containing colloidal particles of the catalytic metal dispersed therein for activating a surface for electroless deposition of metal thereon. The colloidal catalyst sol is obtained by admixing a noble metal salt, a tin salt, and a hydro-halide acid. Although the colloidal catalyst sol gives satisfactory results for activation, the colloidal catalyst sol leaves appreciable room for improvement in activating the surfaces of printed circuit boards, due to the colloidal catalyst particles being of such large size as to prevent the particles from penetrating and hence contacting and activating the surfaces of the narrow, deep recesses. The colloidal catalyst sol of Pat. No. 3,011,920 also leaves room for improvement from the standpoint of inherent stability of the catalyst or activator composition.

The colloidal catalyst sols and baths of the prior art also leave room for improvement with regard tolerance to "dragged in" $CrO_3$— and $H_2SO_4$—containing aqueous conditioner solution. The plastisol-coated plated racks employed in the plating cycle tend to have cracks, fissures and pores in the plastisol, especially after the racks are older and have been in use for an appreciable time, and the conditioning solution may be retained in the cracks, fissures and pores and consequently dragged in to the activator bath despite water rinsing after the conditioning and prior to immersion of the racked articles to be plated into the activator bath. The presence of the dragged in $CrO_3$— and $H_2SO_4$—-containing conditioner solution in the prior colloidal catalyst sols and baths may result in a premature or quite early decomposition of the colloidal catalyst or activator sol to the extent that it will no longer function to effectively catalyze the article surface or surfaces to be electrolessly metal plated.

Moreover, use of the colloidal catalyst sol of U.S. Pat. 3,011,920 in the plating cycle requires a special postactivation treatment of the catalyzed article surface or surfaces with a post-activation solution which may be hazardous as hereafter disclosed, to remove protective colloid and/or deflocculating agent from the deposited colloidal catalytic metal particles. The post-activation solution employed for this special post-activation treatment may contain perchloric acid, and sucn post-activator solution could present an explosion and fire hazard due to the perchloric acid undergoing a spontaneous and explosive decomposition under certain conditions.

BRIEF SUMMARY OF THE INVENTION

The electroless metal plating process of the present invention, in its broader aspects, involves contacting the object or article surfaces intended to be electrolessly metal plated with a substantially colloidal catalyst metal particle-free acid liquid solution of a soluble Lewis base-modified noble metal-tin halide complex until the surface or surfaces are rendered catalytic. The noble metal of the complex is a noble metal that is catalytic to the electroless, i.e. chemical reduction, metal plating of the particular metal or metals in the case of alloy platings, destined to be electrolessly plated on the surface or surfaces. The treatment of the surface or surfaces with the solution of soluble Lewis base-noble metal-tin halide complex is usually by immersing the surface or surfaces in the solution, although any other suitable means of applying the solution onto the surface or surfaces could be utilized, if desired. The thus-obtained catalytically active surface is then electrolessly metal plated to deposit or plate the desired metal or metals on the treated surface or surfaces.

The catalyst solution of the present invention is a colloidal catalyst metal particle-free acid liquid solution containing a soluble Lewis base-modified noble metal-tin halide complex. The noble metal of the complex is a noble metal that is catalytic to the electroless, i.e. chemical reduction metal plating of the particular metal, or metals in the case of alloy plating, destined to be electrolessly plated. The catalyst solution can be a concentrate solution or a concentrate solution which has been diluted with an aqueous liquid, usually water, and a hydrogen halide acid, for example hydrochloric acid, prior to use.

The soluble Lewis base-modified noble metal-tin halide complex of this invention is obtained by mixing together at room temperature or elevated temperature as hereinafter disclosed an acid soluble salt of the noble metal, a soluble stannous halide, a Lewis base, a hydrohalide acid, and holding the thus-obtained reaction mixture for a period sufficient to obtain such complex. The formation of the soluble Lewis base-modified noble metal-tin halide complex of this invention is indicated when the resulting acid solution of the reaction product either as such or when diluted as hereafter disclosed, is catalytically effective for catalyzing the object surface or surfaces to be electrolessly metal plated. By such term "catalytically effective" is meant the acid solution as such or when diluted as hereafter disclosed of the soluble Lewis base-modified complex of this invention will convert an otherwise non-catalytic or substantially non-catalytic object surface or surfaces intended to be electrolessly metal plated into a catalytic surface or surfaces, upon immersion of the non-catalytic surface or surfaces therein for a sufficient immersion time as is hereinafter disclosed, which will result in a satisfactory metal plate or deposit being deposited on the thus-obtained catalytic surface or surfaces upon immersion of such catalytic surface or surfaces in an electroless or chemical reduction metal plating bath, for instance a chemical reduction copper or nickel plating bath, for a time sufficient to deposit the metal on the catalytic surface.

The period of holding the reaction mixture to obtain the soluble Lewis base-modified noble metal-tin halide complex of this invention is a prolonged or length period, usually of a plurality of days in duration and at least 2 days in duration and sufficient to result in the soluble complex. The Lewis base is present in the mixture in an amount which is at least sufficient to obtain an aqueous hydro-halide acid-soluble complex, and the stannous chloride in excess of the amount required to reduce the noble metal salt to zero valent noble metal.

The stannous halide reduces the ionic noble metal to zero valent noble metal in the reaction mixture. A reaction or reactions then occur between the zero valent noble metal, stannous halide and the Lewis base, for instance a 1-4C alkanol, which, although not known with certainty, is believed to involve the alkanol forming a complex or coordination compound with the noble metal and stannous halide, followed by a molecular rearrangement or ligand transfer which is inhibited by the 1-4C alkanol. The Lewis base, such as the 1-4C alkanol, is believed to block or terminate growth of the complex molecule by formation of blocking terminal groups therein to thereby result in a relatively low molecular weight, noncolloidal size, soluble molecule.

The thus-obtained solution of the Lewis base-modified noble metal-tin halide complex in the hydrohalide acid is utilizable as such as an activator for catalyzing the article surface or surfaces to be electrolessly metal plated. However for economic reasons we recommend dilution of such acid solution, which is a concentrate solution, prior to use, for instance by mixing together, by volume, 1 part of such concentrate solution, 1 part of HCl (Analytic Reagant grade) of 37% HCl concentration, and 5 parts of deionized or distilled water. The Lewis base is essential for forming the soluble complex herein inasmuch as in the absence of the Lewis base a soluble complex is not obtained and instead a colloidal sol is formed. Thus when a Lewis base such as methanol was omitted in the preparation of the complex, insoluble, colloidal catalyst particles and a colloidal sol was obtained.

The freedom from colloidal particles of the catalyst or activator solution of this invention was established by an optical method which is a conventional method used to determine the presence or absence of colloidal particles.

The process of this invention involving the treatment of the surface or surfaces intended to be electrolessly metal plated with the colloidal catalyst particle-free activator solution of the soluble Lewis base-modified noble metaltin halide complex constitutes a considerable improvement over the treatment of the surface or surfaces with a colloidal sol catalyst in accordance with the prior art for the reasons (1) greater penetration into narrow recesses and the like to be activated, especially in multi-layer printed circuit board preparation, and also into small holes, notably blind holes and crevices in plating other plastics, by use of the colloidal catalyst particle-free activator solution herein than by use of the prior art colloidal sol catalyst due to the appreciably smaller size of the molecule of the Lewis base modified-noble metal-tin halide complex herein, and hence a considerably greater number of nucleation or catalyst sites provided on the surface by the present invention; (2) complete and continuous coverage of the narrow recesses, crevices and small holes by the electroless metal deposits due to the greater penetration into and hence greater number of nucleation sites consistently provided by the colloidal particle-free activator solution of this invention as contrasted with the incomplete or discontinuous metal deposits on the surface or surfaces not infrequently provided by the prior art process involving use of the colloidal sol catalyst due to the lesser penetration by the appreciably larger size colloidal catalyst particles into the narrow recesses, crevices and small holes and hence an appreciably lesser number of nucleation or catalytic sites provided on such polymeric surfaces; (3) considerably improved inherent stability of the colloidal catalyst particle-free activator solutions herein over the prior colloidal sol or colloidal catalyst metal-containing activator baths; (4) considerably improved tolerance to dragged in $CrO_3$— and $H_2SO_4$—containing aqueous conditioner solutions over such tolerance shown by prior colloidal sol or colloidal catalyst metal-containing activator baths; and (5) enabling the use of a post-activation solution for the post-activation treatment without an explosion hazard, which is a dilute aqueous solution of HCl, which is also ordinarily utilized earlier in the plating cycle and hence is readily available.

Regarding the inherent stability of the colloidal catalyst particle-free activator solutions of this invention, approximately 15 gallons of such colloidal catalyst particlefree activator solution containing the soluble Lewis basemodified noble metal-tin halide complex, after being held in a container for 6 months, exhibited no particle deposition on the container walls and no film formation on the top surface of the solution or elsewhere. However, a colloidal sol showed considerable deposition of particles on the container walls and had a pronounced surface film on the top surface of the sol, after being held in a container for only about 2 months.

Although we do not wish to be bound by theory, it is believed that the mechanism involved in the formation of the soluble Lewis base-modified noble metal-tin halide complex herein is an initial acid-catalyzed reduction of the ionic noble metal by the stannous halide to zero valent noble metal. The Lewis base such as for instance the 1-4C alkanol, e.g. methanol, then forms a complex or coordination compound with the noble metal and stannous halide. A molecular rearrangement or ligand transfer subsequently occurs which is inhibited by the Lewis base, quite probably due to steric blocking mechanisms, as shown in the following:

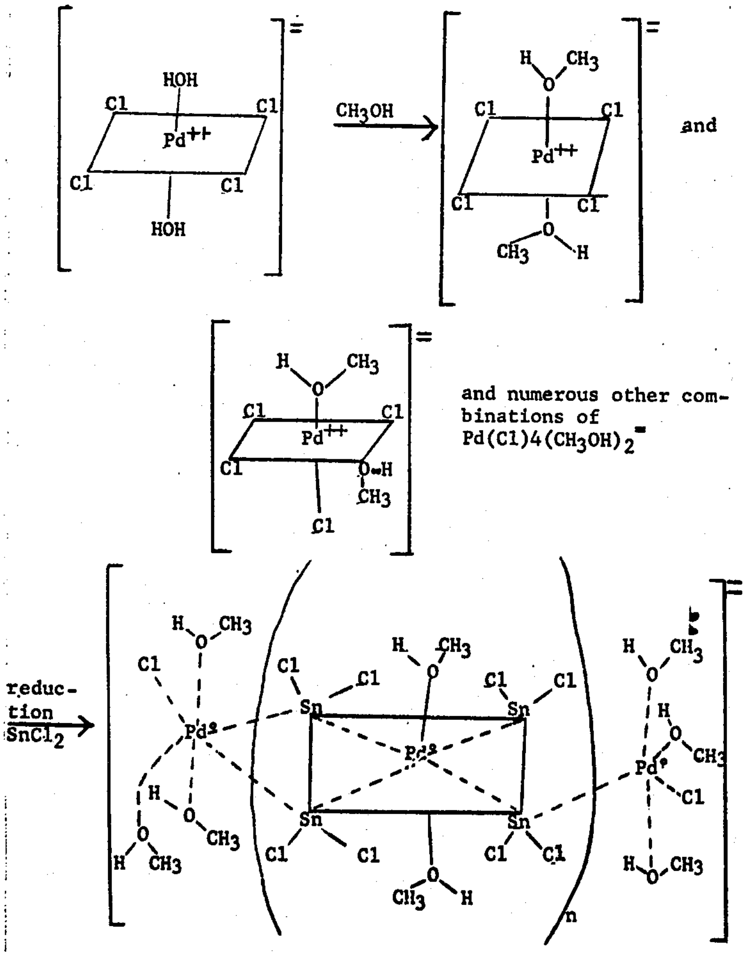

wherein *n* is an integer of value of at least 1, usually more than 1. The soluble complex molecule formed is ionic and specifically anionic.

The soluble stannous halide reactant utilized to form the soluble complex is usually a halide of the formula $SnX_2$, wherein *X* is a halogen atom having an atomic number in the range of 17–35 inclusive. Such stannous halides include stannous chloride and stannous bromide. The stannous halide molecule may contain water of hydration or crystallization.

So far as we are aware, any Lewis base can be utilized as the Lewis base reactant for preparing the soluble complex. By the term "Lewis base" used herein and in the appended claims is meant any atom, ion or molecule other than water that provides a pair of electrons for a covalent bond with a Lewis acid. The Lewis base should of course be compatible in the soluble complex of this invention. By "compatible" as used herein in referring to the Lewis base is meant a Lewis base, as defined immediately above, that will accomplish its intended function in the preparation of the soluble Lewis basemodified noble metal-tin halide complex of this invention by preventing formation of an insoluble, relatively high molecular weight complex and the precipitation of zero valent noble metal, and not introducing molecules, atoms or ions into the complex or catalyst solution that will substantially adversely affect the catalyst or activator solution or its ability to effectively catalyze a surface or surfaces to be electrolessly metal plated. By the term "Lewis acid" is meant any atom, ion or molecule capable of receiving a pair of donor electrons from a Lewis base. Exemplary of the Lewis bases herein are 1-4C alkanols, e.g., methanol, ethanol, n-propanol, isopropanol and n-butanol; compounds of the general formula $$HC(=O)-N(R)(R^1)$$

wherein R and $R^1$ are each —H or —$CH_3$, such as formamide, N N-dimethylformamide or N-methylformamide; mixtures of the 1-4C alkanol and a compound of the formula RCOOM wherein R is a monocyclic carbocyclic aryl group, e.g. phenyl, —H or a 1-4C alkyl group, and M is a compatible, hydrophilic, i.e. water-loving, salt-forming cation, for instance an alkali metal cation, e.g. $Na^+$ or $K^+$ cation; and mixtures of 1-4C alkanol and the compound of the formula

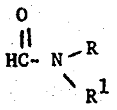

wherein R and $R^1$ have the meaning aforesaid. The compounds of the general formula RCOOM wherein R and M have the meaning aforesaid are exemplified by alkali metal propionates, e.g. sodium propionate and potassium propionate, alkali metal benzoates, e.g. sodium benzoate and potassium benzoate, alkali metal acetates, e.g. sodium acetate and potassium acetate, alkali metal formates, e.g. sodium formate and potassium formate, alkali metal butyrates, e.g. sodium butyrate and potassium butyrate, and alkali metal valerates, e.g. sodium valerate and potassium valerate.

Also, so far as we are aware, any soluble noble metal salt is utilizable herein. Exemplary of noble metal salts utilizable herein are salts of platinum group metals, e.g. palladium chloride, palladium bromide, palladium sulfate, palladium nitrate, diammine palladium hydroxide, platinum chloride, platinum bromide, platinum sulfate and aurous chloride. Salts of other platinum group metals utilizable herein are salts of rhodium, ruthenium, osmium and iridium, e.g. iridium dichloride, osmium trichloride, rhodium trichloride, rhodium sulfate and ruthenium tetrachloride. Salts of silver are also utilizable herein, e.g. silver nitrate. The particular soluble noble metal salt utilized of course will correspond to the particular noble metal desired in the complex.

The reaction temperatures for preparing the soluble Lewis base-modified noble metal-tin halide complex herein can range from room temperature to elevated temperature of about 150° inclusive.

The relative proportions of the reactants can be varied considerably provided the Lewis base is present in the reaction mixture in an amount at least sufficient to maintain or retain solubility in the complex, the stannous halide is present in excess, typically a large excess of 600% or more, over the theoretical amount required to reduce all noble metal salt to zero valent noble metal, and the pH of the reaction mixture is maintained on the acid side of pH7 and usually below about 1. The acid pH of the reaction mixture is maintained by the addition of a hydro-halide acid, usually hydrochloric acid.

The Lewis base should be present in the reaction mixture at the outset of the redox reaction between the stannous halide and noble metal salt, to prevent the formation of an insoluble, relatively high molecular weight colloidal system and the precipitating out of zero valent noble metal.

The activator concentrate solutions and diluted concentrate solutions are acid solutions and usually have a pH below about 1.

DESCRIPTION OF THE PREFERRED EMBODIMENTS

The Lewis base, for example the 1-4C alkanol, e.g. methanol, is preferably added in the formation of the reaction mixture before addition of the acid-soluble noble metal salt. If the Lewis base is not present at the outset of the redox reaction between the stannous halide and noble metal salt, this redox reaction, which occurs rapidly, may result in the zero valent noble metal resulting from the redox reaction either forming an insoluble, relatively high molecular weight colloidal system and/or precipitating out.

The soluble stannous halide reactant is preferably added to the reaction mixture in the preparation of the soluble Lewis base-modified noble metal-tin halide complex herein in increments with mixing of the resulting mixture between the increment additions. The water-soluble stannous halide is preferably in solution in an aqueous hydro-halide acid solution for each increment addition, the anion of the hydro-halide acid preferably being identical to the anion of the stannous halide. The hydro-halide acid is usually of the formula *HX* wherein X is a halogen atom having an atomic number of 17–35 inclusive, which includes HCl and HBr. An amount of stannous halide is preferably added in the first incremental addition which is in excess of the amount stoichiometrically required to reduce all noble metal salt to zero valent noble metal. The size of each of the additional incremental additions of the soluble stannous halide and the number of such incremental additions are not especially critical and are sufficient in size and number to provide an amount of stannous halide in the reaction mixture which is sufficient to apparently slowly promote a slight increase in molecular size of the complex to a species capable of catalyzing the chemical reduction deposition of a metal or metals to be electrolessly plated. The temperature of the reaction mixture during the mixing between the incremental additions of stannous halide is preferably in the range of about 90°F. to about 130°F., more preferably about 100°F. to about 120°F. The reaction temperature can be maintained within such temperature ranges by supplemental heating from an external source and/or by cooling, as required.

The Lewis base, for example the 1-4C alkanol, e.g. methanol, is preferably added to the reaction mixture prior to the addition of the noble metal salt as previously disclosed herein and is added in amount which is at least sufficient to prevent an insoluble relatively high molecular weight colloidal catalyst system from forming and a zero valent noble metal from precipitating. Thereafter incremental additions of the Lewis base are preferably made, with mixing of the resulting reaction mixture between the increment additions. The amount of Lewis base added in each increment addition and the number of such increment additions is not especially critical so long as the amount of Lewis base added is sufficient together with the Lewis base already present in the reaction mixture to maintain the molecular size of the complex in the relatively low molecular weight, non-colloidal, soluble size range.

At least one incremental addition of the alkanol is preferably made simultaneous with the soluble stannous halide incremental addition, with the alkanol and soluble stannous halide being in the same solution which also contains a hydrohalide acid.

Preferably an alkali stannate, for example an alkali metal stannate, e.g. sodium or potassium stannate, is added to the reaction mixture prior to the addition of the stannous chloride to facilitate the reaction.

The preferred noble metal salt reactant is palladium chloride. The preferred stannous halide reactant is stannous chloride. The hydrohalide acid is preferably hydrochloric acid when palladium chloride and stannous chloride are reactants.

The reaction temperature for preparing the soluble Lewis base-modified noble metal-tin halide complex herein is more preferably in the range of from about 90°– 130°F., more preferably from about 100°– 120°F.

Preferred Lewis bases for use in forming such complex are the 1-3C alkanols. Methanol is preferred among such alkanols.

Among the Lewis bases of the formula RCOOM wherein R and M have the meaning previously disclosed herein, the alkali metal formates, alkali metal acetates and alkali metal propionates are preferred.

The reaction medium for forming the soluble Lewis base-modified noble metal-tin halide complex is an acid aqueous medium preferably of a pH below about 1.

An especially preferred method of preparing the soluble Lewis base-modified noble metal-tin halide complex is by introducing the hydro-halide acid, water and preferably the 1-3C alkanol into a reaction vessel or zone, supplying to the reaction zone an acid solution of the acid-soluble salt of the noble metal in the hydrohalide acid, and mixing or stirring the thus-obtained liquid mixture in the reaction zone for a period of usually about 1–2 hours at a temperature in the range of about 90°F. to about 130°F., more preferably about 100°F to about 120°F. An acid solution containing the hydrohalide acid, the stannous halide and 1-3C alkanol is then added to the thus-obtained liquid mixture. Preferably the resulting mixture is then mixed for a period usually about 2–3 hours at a temperature in the range of about 90°F. to about 135°F., more preferably about 100°F. to about 120°F. To the resulting liquid mixture are preferably and separately added an acid solution of the soluble stannous halide in the hydro-halide acid and another solution of the alkali metal propionate, alkali metal acetate or alkali metal formate in the 1-3C alkanol. The thus-obtained liquid mixture is preferably mixed for a period usually in the range of about 3–4 hours at a temperature in the range of about 90°F. to about 130°F., more preferably about 100°F to about 120°F. To the resulting liquid mixture is preferably and separately added an aqueous solution of the alkali metal propionate, alkali metal acetate or alkali metal formate, the hdyro-halide acid, and the stannous halide. The thus-obtained liquid mixture is held for a period of usually at least about 5–6 days which is sufficient to obtain the soluble 1-3C alkanol-modified noble metalstannous halide complex. This holding reaction time may extend for as long as 16 days and even longer. The reaction continues during at least an appreciable portion of this holding period to yield the functional soluble complex. This last-mentioned holding step is ordinarily effected without application of external heat to the reaction mixture and ordinarily without stirring of the reaction mixture. Although this last-mentioned holding step is preferably carried out in the reaction vessel, the reaction mixture can be introduced into containers for marketing, for instance drums, prior to this holding step and such holding step carried out in the marketing container, with continiuation of the reaction in the container to form the soluble complex. In this event, it is important to provide venting of the container or drum interior to release gas pressures. The venting can be effected by using a conventional vented cap over the pouring outlet of the container or by punching a hole through the top of the cap. When the holding step is carried out with the reaction mixture in the marketing container, the container should not be delivered to a customer until after the end of the holding period previously disclosed herein unless the customer is apprised of the situation and does not intend to use the catalyst solution until after the end of the holding period previously disclosed herein.

In another especially preferred method of preparing the soluble Lewis base-modified noble metal-tin halide complex of this invention, the hydro-halide acid, water and alkali metal stannate, e.g. sodium stannate, are introduced into a reaction vessel or zone. The 1-3C alkanol is then added to the liquid mixture in the reaction vessel. A solution of the acid-soluble salt of the noble metal in the hydro-halide acid is then added to the liquid mixture in the reaction vessel, and a separate solution containing the stannous halide, hydrohalide acid, and 1-3C alkanol is also added to the mixture in the reaction vessel, the liquid mixture in the reaction vessel being stirred during the addition of each solution. The two solutions can be added in any sequence or simultaneously. An exothermic reaction occurs in the liquid mixture with the exothermic heat raising the temperature of the mixture to within the range of about 100°F. to about 120°F. inclusive. The liquid reaction mixture is stirred for about 2 hours and then a solution containing the alkali metal propionate, alkali metal acetate or alkali metal formate, and also containing the 1-3C alkanol is added to the reaction mixture. A separate solution containing the stannous halide and hydro-halide acid is also added to the reaction mixture, with the two lastmentioned solutions being added simultaneously or in any sequence to the reaction mixture. The resulting mixture is permitted to react for about 1 ½ hours at a temperature in the range of about 100°F. to about 120°F. with stirring of the reaction mixture during this reaction period. A solution containing the alkali metal propionate, alkali metal acetate or alkali metal formate and also containing the 1-3C alkanol is then again added to the reaction mixture, and a separate solution containing the stannous halide and hydro-halide acid is also then added to the reaction mixtures. The two last-mentioned solutions can be added simultaneously or in any sequence to the reaction mixture. The thus-obtained reaction mixture is then permitted to react for an additional 1 ½ hours at a temperature in the range of about 100°F. to about 120°F. with continuous stirring of the reaction mixture during this reaction period. A solution containing either the alkali metal propionate, alkali metal acetate or alkali metal formate and the 1-3C alkanol is thereafter again added to the reaction mixture, and a solution containing the stannous halide and hydro-halide acid is also then added to the reaction mixture in the reaction vessel. The two last-mentioned solutions can be added simultaneously or in any sequence to the reaction mixture in the reaction vessel. The thus-obtained mixture is then stirred for about 1 hour at a temperature in the range of about 100°F. to about 120°F. A solution containing either the alkali metal propionate, alkali metal acetate or alkali metal formate and the 1-3C alkanol is then again added to the reaction mixture in the reaction vessel, and a separate solution containing the stannous halide and hydro-halide acid is also then added to the reaction mixture. The two last-mentioned solutions are added simultaneously or in any sequence to the reaction mixture in the reaction vessel. The resulting reaction mixture is stirred for about one-half hour at a temperature in the range of about 95°F. to about 100°F. The thus-obtained liquid mixture is held for a period of at least about 5–6 days and ordinarily without application of external heat to the reaction mixture and oridinarily without stirring of the reaction mixture, whereby the soluble 1-3C alkanol-modified noble metal-stannous halide complex is obtained. The last-mentioned holding step is preferably carried out in the reaction vessel but can, if desired, be carried out in the marketing containers, for instance drums. If the holding step is carried out in the marketing drums, the drums should be vented to release gas pressures as previously pointed out herein.

The mixing or stirring in the preparation methods set forth immediately supra can be effected with any suitable mixer or stirrer.

The article or substrate surface or surfaces to be plated, if not already clean, are cleaned, for instance by immersion in a conventional hot non-silicated alkaline cleaner solution. However, any suitable means of cleaning the surface can be utilized including mechanical cleaning, such as for example by sanding or abrading. The surface or surfaces are then rinsed in water. Following the rinsing, the surface or surfaces to be plated may then be dipped in a dilute acid solution, e.g. an aqueous HCl solution of 20% HCl concentration, to neutralize any alkaline material remaining, followed by water rinsing the thus-treated surface or surfaces.

The thus-treated substrate surface or surfaces are than catalyzed by immersing the surface or surfaces in the colloidal metal particle-free liquid activator solution of the soluble Lewis base-modified noble metal-tin halide complex of this invention and specified in Example 1 for a time sufficient to render the surface or surfaces catalytically active, usually at time of 1 minute or more. Alternatively and less preferably such solution of soluble Lewis base-modified noble metal-tin halide complex can be sprayed onto the surface or surfaces to be catalyzed. The thus-obtained catalyzed surface or surfaces are then withdrawn from the activator or catalyst solution and ordinarily rinsed in water.

The catalyzed surface or surfaces are then ordinarily contacted with, usually by immersing in, a post-activation solution, preferably a dilutue solution of HCl (10–25% HCl concentration), for a contact time which is sufficient to assure exposure of catalytic noble metal on the surface or surfaces, usually 1 minute or longer, followed by ordinarily rinsing in water. The contacting with the post-activation assures exposure of the catalytic noble metal on the surface or surfaces.

Any solution capable of assuring exposure of the catalytic noble metal on the surface or surfaces to be electrolessly metal plated can be utilized as the post-activation solution, although the dilute HCl solution is preferred as previously disclosed herein. Although we do not wish to be bound by theory, it is believed that the post-activation solution treatment functions to remove material such as, for instance, excess tin from the treated surface or surfaces thereby exposing catalytic noble metal. However another explanation advanced is that the post-activation solution treatment renders material other than the catalytic noble metal on the treated surface or surfaces incapable of detrimentally interfering with the catalytic activity of the noble metal.

The catalytic surface or surfaces are then electrolessly metal plated by contacting the catalyzed surface or surfaces, usually by immersing such surface or surfaces in, a chemical reduction metal plating solution for plating the desired metal, for example a chemical reduction copper plating solution, a chemical reduction nickel plating solution, a chemical reduction cobalt plating solution, or a chemical reduction cobalt-nickel plating bath for depositing cobalt-nickel alloys. The catalyzed surface or surfaces is contacted with the chemical reduction metal plating solution until a metal plate or layer of the desired thickness is deposited on the surface or surfaces. The thus-plated surface or surfaces are then rinsed with water. Exemplary of the chemical reduction aqueous metal plating baths are the copper, nickel, cobalt and cobalt-nickel plating baths which follow:

Chemical Reduction Copper Plating Bath

| | g/l |
|---|---|
| Copper sulfate | 29 |
| Sodium carbonate | 25 |
| Rochelle salt | 140 |
| Versene T | 17 |
| Sodium hydroxide | 40 |
| Formaldehyde (37% solution) | 166 |

"Versene T" is a trademarked material obtained in commerce and containing EDTA and triethanolamine. The bath is operated at a bath temperature of 70°F. and has a pH before plating of 11.5.

Chemical Reduction Nickel Plating Bath

| | g/l |
|---|---|
| Nickel chloride | 30 |
| Sodium citrate | 20 |
| Ammonium chloride | 50 |
| Sodium hypophosphite | 10 |
| Ammonium hydroxide | 30 |

The pH of the bath is adjusted to 8–10 with $NH_4OH$, and the bath is operated at a bath temperature of 70°-110°F.

Chemical Reduction Cobalt Plating Bath

| | g/l |
|---|---|
| Cobalt chloride | 30 |
| Sodium citrate | 35 |
| Ammonium chloride | 50 |
| Sodium hypophosphite | 20 |

The pH of the bath is adjusted to 9–10 with ammonia, and the bath is operated at a temperature of 195°–205°F.

Chemical Reduction Cobalt-Nickel Plating Bath

| | g/l |
|---|---|
| Cobalt chloride | 30 |
| Nickel Chloride | 30 |
| Rochelle salt | 200 |
| Ammonium chloride | 50 |
| Sodium hypophosphite | 20 |

The pH of the bath is adjusted to 8–10 with ammonia and the bath is operated at a temperature of 195°–205°F.

After the electroless plating is completed, the substrate surface or surfaces are usually then electroplated with the desired metal, for example, copper. A typical electroplating bath for this purpose is an acid sulfate aqueous bath containing 200-300 g/l of $CuSO_4 \cdot 5H_2O$ and 15-40 g/l of free $H_2SO_4$ (66°Be ). An additional metal or metals can then be electroplated over such electroplate layer, if desired.

The following examples are given by way of illustration but not by way of limitation:

EXAMPLE 1

A soluble Lewis base-modified noble metal-tin halide complex of this invention was prepared as follows:

Five-hundred and twenty ml. of HCl (A.R. Grade) of 37% HCl concentration, 165 ml. of distilled water, 6.60 grams of sodium stannate and 131 ml. of anhydrous methanol were introduced into a reaction vessel. 1.65 grams of palladium chloride in solution in 4.4 ml. of HCl (A.R. Grade) of 37% concentration was then supplied to the reaction vessel. The above materials were mixed in the reaction vessel and the reaction temperature was brought to 100°–120°F. by exothermic heat and supplemental heating, as required, and maintained within such temperature range by supplemental heating. After the materials had been mixed for one hour at the temperature in the range of 100°–120°F., there was added to the reaction mixture a solution composed of 26.2 ml. HCl (A.R. Grade) of 37% HCl concentration, 16.5 grams of anhydrous stannous chloride and 7.3 ml. anhydrous methanol. The resulting liquid mass in the reaction vessel was mixed for 2hours at a temperature in the range of 100°–120°F., followed by the separate addition to the resulting mixture of (1) a solution composed of 14.9 grams of anhydrous stannous chloride in 24.8 ml. of HCl (A.R. Grade) of 37% HCl concentration and (2) 3.45 ml. of a solution of 24 grams of sodium propionate in anhydrous methanol. The thus-obtained liquid mass was mixed for 3 hours at a temperature in the range of 100°–120°F. followed by the separate addition to the thus-obtained liquid mixture of 2.3 ml. of a solution composed of 24 grams of sodium propionate in water, 117 ml. of HCl (A.R. Grade) of 37% HCl concentration, and 190 grams of anhydrous stannous chloride. The thus-obtained liquid mixture was held in the reaction vessel for a period of 6 days, at which time the resulting liquid solution of soluble methanol-modified palladium-tin chloride complex was ready for use for activating or catalyzing the article surface or surfaces intended to be electrolessly metal plated.

Although the thus-obtained liquid solution can be utilized as such as an activator, it is adapted to be mixed together with an aqueous liquid solvent, usually water, prior to use, and it is preferably so mixed or diluted prior to use and typically by mixing together the thus-obtained liquid solution or concentrate, the hydro-halide acid, e.g. HCl, and purified water in the proportions of 1 gallon of HCl (A.R. Grade of 37% concentration) and 5 gallons of deionized or distilled water per gallon of the thus-obtained liquid solution concentrate. Such a diluted activator solution gives good results in catalyzing article surfaces for electroless metal plating at room temperature of the solution and an immersion time of 3 minutes.

The reaction of the methanol with the palladium and/or stannous chloride was evidenced by gassing of the reaction mixture after each incremental addition of the methanol, and the formation of an insoluble, colloidal sol when methanol was omitted as a reactant.

EXAMPLE 2

The preparation procedure of Example 1 is repeated except the stannous bromide and HBr are utilized in this Example instead of the stannous chloride and HCl of Example 1. A soluble methanol-modified-palladium-tin bromide complex is obtained which is in solution in the aqueous acidic liquid reaction medium.

EXAMPLE 3

The preparation procedure of Example 1 is repeated except that platinum chloride ($PtCL_2$) is utilized in this Example instead of the palladium chloride of Example 1. A soluble methanol-modified-platinum-tin chloride complex is obtained which is in solution in the aqueous acidic liquid reaction medium.

EXAMPLE 4

The preparation procedure of Example 1 is repeated except that platinum bromide ($PtBr_2$) is utilized in this Example instead of the palladium chloride of Example 1. A soluble methanol-modified-platinum-tin chloride complex is obtained which is in solution in the aqueous acidic liquid reaction medium.

EXAMPLE 5

The preparation procedure of Example 1 is repeated except that aurous chloride (AuCl) is utilized in this Example instead of the palladium chloride of Example 4. A soluble methanol-modified-gold-tin chloride complex is obtained which is in solution in the aqueous acidic liquid reaction medium.

EXAMPLE 6

The preparation procedure of Example 1 is repeated except that ethanol is utilized in this Example instead of the methanol of Example 1. A soluble ethanol-modified-palladium-tin chloride complex is obtained which is in solution in the aqueous acidic liquid reaction medium.

EXAMPLE 7

The preparation procedure of Example 1 is repeated except that ethanol and platinum chloride ($PtCl_2$) are utilized in this Example instead of the methanol and palladium chloride respectively of Example 1. A soluble ethanol-modified-platinum-tin chloride complex is obtained which is in solution in the aqueous acidic liquid reaction medium.

EXAMPLE 8

The preparation procedure of Example 1 is repeated except that ethanol, stannous bromide and HBr are utilized in this Example instead of the methanol, stannous chloride and HCl respectively of Example 1. A soluble ethanol-modified-palladium-tin bromide complex is obtained which is in solution in the aqueous acidic liquid reaction medium.

EXAMPLE 9

The preparation procedure of Example 1 is repeated except that propanol is utilized in this Example instead of the methanol of Example 1. A soluble propanol-modified-palladium-tin chloride complex is obtained which is in solution in the aqueous acidic liquid reaction medium.

EXAMPLE 10

The preparation procedure of Example 1 is repeated except that propanol and platinum chloride ($PtCl_2$) are utilized in this Example instead of the methanol and palladium chloride respectively of Example 1. A soluble propanol-modified-platinum-tin chloride complex is obtained which is in solution in the aqueous acidic liquid reaction medium.

EXAMPLE 11

A plurality of copper-clad "G-10" epoxy-fiberglass boards were plated with electroless copper and then electroplated with copper as follows:

1. Immersed in hot alkaline cleaner, 3 to 5 minutes, 140°–160°F.

2. Water rinsed.
3. Immersed in ammonium persulfate-containing solution, 1 lb./gal., room temperature, 3 minutes.
4. Water rinsed.
5. Immersed in 15% sulfuric acid solution, room temperature, 1-3minutes.
6. Water rinsed.
7. Immersed in 1–25% hydrochloric acid solution, room temperature, 1-2 minutes.
8. Water rinsed.
9. Immersed in methanol-modified-palladium-tin chloride complex-containing activator solution of this invention, room temperature, 3–5 minutes. Such activator solution was obtained by mixing together 1 volume of HCl (Analytic Reagent Grade) of 37% HCl concentration and 1 volume of deionized water per each 1 volume of the methanol-modified-palladium-tin chloride complex-containing soluton concentrate prepared by the procedure of Example 1 herein.
10. Water rinsed.
11. Immersed in 10–20% hydrochloric acid solution, room temperature, 3–5 minutes.
12. Water rinsed.
13. Electroless copper plated, room temperature, 8–12 minutes.
14. Water rinsed.
15. Electroplated with copper.

The copper coverage of the surfaces of all through holes of the boards was complete with no skip plating detected.

EXAMPLE 12

A plurality of acrylonitrile-butadiene-styrene copolymer, i.e. ABS copolymer, salt shaker caps were electrolessly nickel plated with a conventional room temperature electroless nickel plating bath and then electroplated with copper as follows:

1. Immersed in hot alkaline cleaner, 140°–160°F., 5 minutes.
2. Water rinsed.
3. Chemically conditioned plastic by immersion in a conventional $CrO_3$— and $H_2SO_4$ aqueous solution.
4. Water rinsed.
5. Immersed in 10–20% hydrochloric acid solution, room temperature, 1 minute.
6. Water rinsed.
7. Immersed in a methanol-modified palladium-tin chloride complex-containing activator solution of this invention, and obtained as set forth in Example 11 (Step 9) herein, room temperature, 3 minutes.
8. Water rinsed.
9. Immersed in 10–20% hydrochloric acid solution, room temperature, 3 minutes.
10. Water rinsed.
11. Electrolessly nickel plated, room temperature, 10 minutes.
12. Electroplated with copper.

The metal plate deposited on the cap surfaces was firmly adherent and complete, and no skip plating was detected.

EXAMPLE 13

A plurality of ABS copolymer knobs for dishwashers and ABS copolymer door handles were metal plated utilizing the same plating cycle plating conditions and compositions as utilized in Example 11. The activator solution utilized was a methanol-modified-palladium-tin chloride complex-containing activator solution of this invention and obtained as set forth in Example 11 (step 9) herein. The metal plate deposited on the knob surfaces and door handle surfaces was firmly adherent and complete, with no skip plating detected.

EXAMPLE 14

Tests were conducted to compare the stability of the colloidal particle-free methanol-modified-palladium-tin chloride complex-containg catalyst solution of this invention with that of colloidal baths containing colloidal palladium metal particles. In preparing the non-colloidal catalyst solution and colloidal baths for the tests, in each case 1 volume of the catalyst concentrate was mixed together with 5 volumes of deionized water and 1 volume of hydrochloric acid (A.R. Grade) of 37% HCl concentration. The catalyst concentrate used to prepare the non-colloidal catalyst solution of this invention was also a true solution free of colloidal particles and was prepared in accordance with Example 1 herein.

A portion of each catalyst composition was introduced into separate clean containers which were then covered, and the other portion of each catalyst composition was introduced into separate clean containers which were left uncovered. The containers were of the same size and capacity and of large diameter so that a high ratio of surface area to total volume of each catalyst composition was provided in each test. The liquid compositions were held, i.e. left standing, in the covered and uncovered containers until each decomposed as indicated by a complete loss of the characteristic intense dark color of the liquid and the failure of the liquid to function as a catalyst. The time at which such decomposition occured was noted for each composition and is set forth hereafter in Table I:

Table I

| Catalyst Composition | Time to Decomposition Covered Catalyst (Days) | Uncovered Catalyst (Days) |
|---|---|---|
| Colloidal Particle-Free Lewis Base-Modified-Palladium-Tin Chloride-Containing Solution prepared in accordance with Example 1 herein. | 35–38 | 26–27 |
| Colloidal Palladium Metal-Containing Bath No. 1. | 11–14 | 10–11 |
| Colloidal Palladium Metal-Containing Bath No. 2. | 7–8 | 5–6 |
| Colloidal Palladium Metal-Containing Bath No. 3. | 18–19 | 15–18 |

In Table I above, the first smaller number of days set forth in each "Time to Decomposition" column is the time at which loss of intense dark color of the catalyst composition or skip plating of the electrolessly metal plated surfaces was first noted, and the second larger number of days set forth in such column is the time at which complete loss of the intense dark color of the catalyst composition has occurred and virtually no electroless metal plating of the treated surfaces to be plated had occurred. Thus in the first line of Table I, the first smaller number of days is 35 and the second larger number of days is 38 in the "Covered Catalyst" column whereas the first number of days is 26 and the second number of days is 27 in the "Uncovered Catalyst" column, and this order of specifying the days is followed throughout the table. Colloidal Palladium Metal-Containing Bath No. 1 of this Example and also of Example 15 which follows was prepared by a procedure similar to that of Example 1 except that no Lewis base was utilized in the preparation. The Colloidal Palladium Metal-Containing Baths Nos. 2 and 3 of this Example and also of Example 15 which follows were catalyst baths obtained in commerce.

The considerable improvement in stability of the catalyst true solution of this invention over that of the colloidal baths is shown by the foregoing Table I of the test results.

EXAMPLE 15

Tests were also conducted to determine the tolerance of the colloidal particle-free Lewis base-modified-palladium-tin chloride-containing activator solution of this invention to small amounts of a chromic acid-and sulfuric acid-containing conditioner solution as compared with the tolerance of colloidal palladium metal-containing baths to such conditioner soluiton. Such chromic acid-and sulfuric acid-containing conditioner solution may be dragged in to the activator solution by being included in cracks, crevices or pores of the plastisol-coated plating racks, especially plating racks which have been in use for a substantial period, or in crevices, pores, etc. of the article being plated. A catalyst true solution of this invention and a colloidal catalyst bath were prepared as set forth in Example 14 herein. Two additional colloidal catalyst baths obtained in commerce were also provided. 0.75% by volume of a $CrO_3$- and $H_2SO_4$ containing aqueous conditioner solution (based on the volume of each catalyst composition) was introduced into each catalyst composition. The $CrO_3$— and $H_2SO_4$— containing aqueous solution contained, by weight, 27.5% of $CrO_3$ and 27.0% of $H_2SO_4$. The catalyst compositions were then held in containers until each was incapable of functioning as a catalyst for electroless copper plating, as indicated by the complete loss of the characteristic intense dark color of the liquid and the failure of the liquid composition to function as a catalyst. The time at which this occurred was noted for each catalyst composition and is set forth hereafter in Table II:

Table II

| Catalyst Composition | Time to Non-Functioning as Catalyst (Elapsed Days) |
|---|---|
| Colloidal Particle-Free Lewis Base-Modified Palladium-Tin Chloride Complex-Containing Solution prepared in accordance with Example 14 herein. | 45–52 |
| Colloidal Palladium Metal-Containing Bath No. 1. | 7–14 |
| Colloidal Palladium Metal-Containing Bath No. 2. | 1–4 |
| Colloidal Palladium Metal-Containing Bath No. 3. | 22–25 |

In Table II above, the first smaller number of days set forth in the "Time to Non-Functioning as Catalyst" column is the time at which loss of intense dark color of the catalyst composition or skip plating of the electrolessly metal plated surfaces was first noted, and the second number of days set forth in such column is the time at which complete loss of the intense dark color of the catalyst composition had occurred and virtually no electroless metal plating of the treated surfaces to be plated had occurred. The test results of Table II show the considerable improvement in tolerance of the colloidal particle-free Lewis base-modified-palladium-tin chloride complex-containing catalyst solution of this invention to the small amount of $CrO_3$— and $H_2SO_4$— containing aqueous conditioner solution over the tolerance to such conditioner solution of the colloidal baths.

EXAMPLE 16

Testing of the non-colloidal activator solution of this invention containing the Lewis base-modified-palladium-tin chloride soluble complex prepared in accordance with Example 1 herein, for catalyzing through holes of copper-clad "G-10" epoxy-fiberglass printed circuit boards consistently resulted in firm adherence of the electroless copper to the copper cladding. And this firm adherence was attained without the necessity of special post-activation treatment of the boards in special post-activator solutions other than dilute HCl solution, which is a relatively non-hazardous solution as contrasted with solutions of the perchloric acid which tend to present an explosion and fire hazard.

EXAMPLE 17

Part A

Five-hundred and twenty-one (521) ml. of HCl (A.R. Grade) of 37% HCl concentration, 165 ml. of distilled water and 6.60 grams of sodium stannate were introduced into a reaction vessel equipped with a magnetic stirrer. 130.9 ml. of formamide was then added to the mixture in the reaction vessel. A solution of 1.65 grams of palladium chloride in 4.40 ml. of HCl (A.R. Grade) of 37% concentration was added to the mixture in the reaction vessel, and a solution containing 11.56 grams of stannous chloride, 9.70 ml. of HCl (A.R. Grade) of 37% HCl concentration and 7.30 ml. of formamide was also added to the mixture in the reaction vessel, the mixture being stirred during the addition of each solution. The resulting reaction was exothermic with the exothermic heat raising the temperature of the reaction mixture to within the range of about 100°–120°F. inclusive. After 2 hours of stirring, 0.55 ml. of a solution consisting of 0.138 gram of sodium propionate and 5.73 ml. of formamide was added to the reaction mixture, and a solution consisting of 4.95 grams of stannous chloride and 16.50 ml. of HCl (A.R. Grade) of 37% HCl concentration was also added to the reaction mixture in the reaction vessel. The thus-obtained mixture was then permitted to react for 1 ½ hours at a temperature of about 100°–120°F. with continuous stirring of the reaction mixture.

1.38 ml. of the solution consisting of 0.138 gram of sodium propionate and 5.73 ml. of formamide was then added to the reaction mixture, and a solution consisting of 6.60 grams of stannous chloride and 8.26 ml. of HCl (A.R. Grade) of 37% HCl concentration was also added to the reaction mixture in the reaction vessel. The thus-obtained mixture was then permitted to react for 1 ½ hours at a temperature of about 100°–120°F. with continuous stirring of the reaction mixture. 1.38 ml. of the solution consisting of 0.138 gram of sodium propionate and 5.73 ml. of formamide was then added to the reaction mixture, and a solution consisting of 8.26 grams of stannous chloride and 16.50 ml. of HCl (A.R. Grade) of 37% HCl concentration was also added to the reaction mixture in the reaction vessel. The resulting mixture was then stirred for 1 hour at a temperature of about 100°–120°F. The remaining 2.42 ml. of the solution consisting of 0.138 gram of sodium propionate and 5.73 ml. of formamide was then added to the reaction mixture, and 117 ml. of HCl (A.R. Grade) of 37% HCl concentration and 190 grams of stannous chloride were also added to the reaction mixture in the reaction vessel. The resulting reaction mixture was stirred continuously for an additional one-half hour at a temperature of about 95°–100°F. after which the reaction mixture was transformed to a plastic container for holding for further reaction.

Part B

Plating tests were then carried out with the thus-obtained reaction product-containing solution to electrolessly nickel plate panels of ABS, i.e. acrylonitrile-butadiene-styrene, copolymer. The following plating procedure was followed:

1. Conditioned the ABS panels by immersion in a proprietary conditoner solution for 8 minutes at a solution temperature of 140°F., followed by water rinsing.
2. Post-conditioned by immersion in an aqueous post-conditioner solution containing 20% by volume hydrochloric acid for 1 minute at room temperature of the solution followed by water rinsing.
3. Immersed for 1 minute in activator solution obtained by mixing together 1 part of the reaction product solution of Part A of this Example, which reaction product had been held for a number of days for further reacting to form a soluble Lewis base-modified-palladium-tin halide complex, 1 part of HCl (A.R. Grade) of 37% HCl concentration and 5 parts of water, all parts being by volume. The ABS panels were immersed in different activator solutions the reaction product solutions of which had been held for different time periods for further reacting. The activator solution was at room temperature during the immersing. The panels were then water rinsed.
4. Immersed for 3 minutes in a post activator aqueous solution containing 20% by volume of HCl (A.R. Grade) at room temperature of the solution, followed by rinsing in water.
5. Chemical reduction nickel plated by immersion in a proprietary electroless nickel plating bath for 5 minutes at room temperature of the bath.

The estimated coverage of an ABS panel with the nickel plate of the chemical reduction nickel plating of numbered step 5 immediately supra was 98–99% of the panel's surface when the reaction product of the activator solution of numbered step 3 of Part B of this Example had been held for further reacting 1 day, and 100% of the ABS panel'surface when such reaction product had been held for further reacting 13 days.

EXAMPLE 18

Part A

The procedure of Example 17, Part A was repeated except that N,N-dimethylformamide was utilized in this Example 18 instead of formamide.

Part B

The plating procedure of Example 17, Part B was repeated except that the activating step of this Example 18, Part B was carried out utilizing an activator solution obtained by mixing together 1 part of the reaction product of Part A of this Example 18, which reaction product had been held for a plurality of days for further reacting to form a soluble Lewis base-modified palladium-tin halide complex, 1 part of HCl (A.R. Grade) of 37% HCl concentration and 5 parts of water, all parts being by volume.

The estimated coverage of an ABS panel with the nickel plate of the chemical reduction plating step was 70% of the surface when the reaction product of the activator solution utilized in the activating step in Part B of this Example had been held for further reacting 12 days, and 99% of the ABS panel surface when such reaction product had been held for further reacting 14 days.

EXAMPLE 19

Part A

The procedure of Example 17, Part A was repeated except that N, N-dibutylformamide was utilized in this Example 19 instead of formamide.

Part B

The plating procedure of Example 17, Part B was repeated except that the activating step of this Example 19, Part B was carried out utilizing an activator solution obtained by mixing together 1 part of the reaction product solution of Part A of this Example 19, which reaction product had been held for a plurality of days for further reacting to form a soluble Lewis base-modified palladium-tin halide complex, 1 part of HCl (A.R. Grade) of 3% HCl concentration, and 5 parts of water, all parts being by volume.

The estimated coverage of an ABS panel with the nickel plate of the chemical reduction nickel plating step was 0%, i.e., no nickel plate and deposited on the panel, when the reaction product of the activator solution utilized in the activating step in Part B of this Example had been held for further reacting 2 days, and only 20% coverage of one side of the ABS panel and 10% coverage of the other side thereof when such reaction product had been held for further reacting 12 days.

EXAMPLE 20

Part A

The procedure of Example 17, Part A was repeated except that N-methylformamide was utilized in this Example 20 instead of formamide.

Part B

The plating procedure of Example 17, Part B was repeated except that the activating step of this Example 20, Part B was carried out utilizing an activator solution obtained by mixing together part of the reaction product of Part A of this Example 20, which reaction product had been held for a plurality of days for further reacting to form a soluble Lewis base-modified palladium-tin halide complex, 1 part of HCl (A.R. Grade) of 37% HCl concentration, and 5 parts of water, all parts being by volume.

The estimated coverage of an ABS panel with the nickel plate of the chemical reduction nickel plating step was 100% of the panel's surface when the reaction product of the activator solution utilized in the activating step in Part B of this Example had been held for further reacting only 2 days, and was also 100% of the ABS panels surface when such reaction product had been held for further reacting 9 days.

EXAMPLE 21

Part A

The procedure of Example 17, Part A was repeated except that formanilide was utilized in this Example 21 instead of formamide.

Part B

The plating procedure of Example 17, Part B was repeated except that the activating step of this EXample 21 Part B was carried out utilizing the activator solution obtained by mixing together 1 part of the reaction product of Part A of this Example 21, which reaction product had been held for a certain time for further reacting to form a soluble Lewis base modified-palladium-tin halide complex, 1 part of HCl (A.R. Grade) of 37% HCl concentration, and 5 parts of water, all parts being by volume.

The estimated coverage of the ABS panel with the nickel plate of the chemical reduction nickel plating step was 0% when the reaction product of the activiator composition utilized in the activating step in Part B of this Example had been held for further reacting 1 day. The formanilide was totally unsuited as a Lewis base for forming the soluble complex inasmuch as a gel formed almost instantly when the formanilide was added to the reaction vessel.

EXAMPLE 22

Part A

The procedure of Example 17, Part A was repeated except that isopropanol was utilized in this Example 22 instead of formamide.

Part B

The plating procedure of Example 17, Part B was repeated except that the activating step of this Example 22, Part B was carried out utilizing an activator solution obtained by mixing together 1 part of the reaction product of Part A of this Example 22, which product had been held for a number of days for further reacting to form a soluble Lewis base modified-palladium-tin halide complex, 1 part of HCl (A.R. Grade) of 37% HC1 concentration, and 5 parts of water, all parts being by volume.

The estimated coverage of an ABS panel with the nickel plate of the chemical reduction nickel plating step was 99.9% of the panel's surface when the reaction product of the activator solution utilized in the activating step in Part B of this Example had been held for further reacting 12 days, and was 100% of the ABS panel's surface when such reaction product had been held for further reacting 14 days.

EXAMPLE 23 Part A

The procedure of Example 17, Part A was repeated except that ethanol was utilized in this Example 23 instead of formamide.

Part B

The plating procedure of Example 17, Part B was repeated except that the activating step of this Example 23, Part B was carried out utilizing an activator solution obtained by mixing together, by volume, 1 part of the reaction product of Part A of this Example 23, which reaction product had been held for a number of days for further reacting to form a soluble Lewis base modified-palladium-tin halide complex, 1 part of HCl (A.R. Grade) of 37% HCl concentration, and 5 parts of water.

The estimated coverage of an ABS panel with the nickel plate of the chemical reduction nickel plating step was 0% when the reaction product of the activator solution utilized in the activating step in Part B of this Example had been held for further reacting 6 days, and 100% of the panel's surface when the such reaction product had been held for further reacting 13 days.

EXAMPLE 24

Part A

The procedure of Example 17, Part A was repeated except that n-butanol was utilized in this Example 24 instead of formamide.

Part B

The plating procedure of Example 17, Part B was repeated except that the activating step of this Example 24, Part B was carried out utilizing an activator solution obtained by mixing together, by volume, 1 part of the reaction product of Part A of this Example 24, which reaction product had been held for a number of days for further reacting to form a soluble Lewis base modified-palladium-tin halide complex, 1 part of HCl (A.R. Grade) of 37% HCl concentration, and 5 parts of water.

The estimated coverage of an ABS panel with the nickel plate of the chemical reduction nickel plating step was 90% of the panel's surface when the reaction product of the activator composition utilized n the activating step in Part B of this Example had been held for further reacting i13 days, and 100%, of the ABS panel's surface when such reaction product had been held for further reacting 16 days.

EXAMPLE 35

Part A

The procedure of Example 17, Part A was repeated except that n-hexanol was utilized in this Example 25 instead of formamide.

Part B

The plating procedure of Example 17, Part B was repeated except that the acivating step of this Example 25, Part B was carried out utilizing an activator solution obtained by mixing together, by volume, 1 part of the reaction product of Part A of this Example 25, which reaction product had been held for a number of days for further reacting to form a soluble Lewis base modified-palladium-tin-halide complex, 1 part of HCl (A.R. Grade) of 37% HCl concentration, and 5 parts of water.

The estimated coverage of an ABS panel with the nickel plate of the chemical reduction nickel plating step was 0% when the reaction product of the activator solution utilized in the activating step in Part B of this Example had been held for further reacting 1 day, and only 20% on one side of the ABS panel and 0% on the other side thereof when such reaction product had been hald for 8 days. Futher the n-hexanol and water would not form a solution and this precluded the use of n-hexanol as a Lewis base for forming a soluble complex.

EXAMPLE 26

Part A

The procedure of Example 17, Part A was repeated except that sodium benzoate and methanol were utilized in this Example 26 instead of sodium propionate and formamide respectively.

Part B

The plating procedure of Example 17, Part B was repeated except that the activating step of this Example 26, Part B was carried out utilizing an activator solution obtained by mixing together, by volume, 1 part of the reaction product of Part A of this Example 26, which reaction product had been held for a number of days for further reacting to form a soluble Lewis base modified-palladium-tin halide complex, 1 part of HCl (A.R. Grade) of 37% HCl concentration, and 5 parts of water.

The estimated coverage of the ABS panel with the nickel plate of the chemical reduction nickel plating step was only 50% of one side and but 10% of the other side when the reaction product of the activator solution utilized in the activating step in Part B of this Example had been held for additional reacting 5 days, and 100% coverage of the panel's surface when such reaction product had been held for further reacting 12 days.

EXAMPLE 27

Part A

The procedure of Example 17, Part A was repeated except that sodium acetate and methanol were utilized in this Example 27 instead of sodium propionate and formamide respectively.

Part B

The plating procedure of Example 17, Part B was repeated except that the activating step of this Example 27, Part B was carried out utilizing an activator solution obtained by mixing together, by volume, 1 part of the reaction product of Part A of this Example 27, which reaction product had been held for a number of days for further reacting to form a soluble Lewis base modified-palladium halide complex, 1 part of NCl (A.R. Grade) of 37% HCl concentration, and 5 parts of water.

The estimated coverage of the ABS panel with the nickel plate of the chemical reduction nickel plating step was only a slight trace on the panel's surface when the reaction product of the activator solution utilized in the activating step in Part B of this Example had been held for further reacting 1 day, and 100% of the ABS panel's surface when such reaction product had been held for further reacting 12 days.

EXAMPLE 28

Part A

The procedure of Example 17, Part A was repeated except that sodium formate and methanol were utilized in this Example 28 instead of sodium propionate and formanilide respectively.

Part B

The plating procedure of Example 17, Part B was repeated except that the activating step of this Example 28, Part B was carried out utilizing an activator solution obtained by mixing together, by volume, 1 part of the reaction product of Part A of this Example 28, which reaction product had been held for a number of days for further reacting to form a soluble Lewis base modified-palladium-tin halide complex, 1 part of HCl (A.R. Grade) of 37% HCl concentration, and 5 parts of water.

The estimated coverage of an ABS panel with the nickel plate of the chemical reduction nickel plating step was 98% on one side and 80% on the other side when the reaction product of the activator solution utilized in the activating step in Part B of this Example had been held for further reacting 12 days and 100% of the ABS panel's surface when such reaction product had been held for further reacting 15 days.

What is claimed is:

1. A process for the electroless metal plating of a surface which comprises contacting an object noncatalytic surface intended to be electrolessly metal plated with a substantially colloidal metal particle-free liquid catalyst solution containing a soluble Lewis base-modified nobel metal-tin halide complex and a hydrohalide acid until the surface is rendered catalytic, the nobel metal of the complex being a nobel metal catalytic to the chemical reduction deposition of the metal desired to be plated on said surface, the Lewis base being selected from the group consisting of 1-4C alkanols, compounds of the formula $$H\overset{O}{\overset{\|}{C}}-N\begin{matrix}\diagup R\\ \diagdown R_1\end{matrix}$$

wherein R and $R_1$ are each —H or —$CH_3$, mixtures of a 1-4C alkanol and a compound of the formula RCOOM wherein R is monocyclic carbocyclic aryl, —H or 1-4C alkyl and M is a compatible alkali metal cation, mixtures of a compound of the formula RCOOM wherein R and M have the meaning aforesaid and a compound of the formula $$H\overset{O}{\overset{\|}{C}}-N\begin{matrix}\diagup R\\ \diagdown R_1\end{matrix}$$

wherein R and $R_1$ have the meaning aforesaid, and mixtures of the 1-4C alkanols, the catalyst solution being prepared by a process comprising mixing together a soluble salt of the noble metal, the selected Lewis base, a soluble stannous halide and a hydro-halide acid, at a temperature in the range of about 90°F. to about 150°F., and holding the thus-obtained reaction mixture for a period of at least 2 days and sufficient to obtain a catalytically effective solution containing the soluble Lewis base-modified noble metal-tin halide complex, the Lewis base being present in amount sufficient to obtain the soluble complex, the stannous halide being present in excess of the amount required to reduce the soluble noble metal salt to zero valent noble metal, the Lewis base being present in the reaction mixture at the outset of a redox reaction between the stannous halide and the noble metal salt to prevent precipitation of zero valent noble metal and formation of a colloidal system, and electrolessly plating the metal on the thus-obtained catalytic surface by contacting the catalytic surface with a chemical reduction metal plating bath.

2. The process of claim 1 wherein the Lewis base is added in the formation of the reaction mixture prior to the addition of the noble metal salt, the reaction temperature of the mixture is in the range of about 90° to abut about 135°F., and the catalyst solution has a pH below about 1.

3. The process of claim 1 wherein the catalytic surface of the object is contacted with a postactivation solution prior to the electroless metal plating for a contact time sufficient to assure exposure of the catalytic noble metal.

4. The process of claim 3 wherein the post-activator solution is an aqueous HCl solution.

5. The process of claim 3 wherein the reaction temperature is in the range of about 100°F. to about 120°F.

6. The process of claim 1 wherein the Lewis base is a mixture of the 1-4C alkanol and the compound of the formula RCOOM.

7. The process of claim 1 wherein the Lewis base is a mixture of the compound of the formula RCOOM, and the compound of the formula

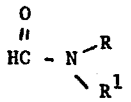

8. The process of claim 1 wherein the Lewis base is a 1-4C alkanol.

9. The process of claim 8 wherein the 1-4C alkanol is methanol.

10. The process of claim 3 wherein the Lewis base is a 1-4C alkanol.

11. The process of claim 10 wherein the 1- 4C alkanol is methanol.

12. The process of claim 10 wherein the soluble stannous halide is added in increments, the first incremental addition of the soluble stannous halide being in excess of the amount thereof stoichiometrically required to reduce all noble metal salt to zero valent noble metal.

13. The process of claim 10 wherein additional 1-4C alkanol is added in increments, at least one incremental addition of the 1-4C alkanol being made simultaneously with the incremental additional of soluble stannous halide.

14. The process of claim 13 wherein at least one incremental addition of the 1-4C alkanol is made simultaneously with the incremental addition of soluble stannous halide, the 1-4C alkanol and stannous halide being in the same solution which also contains a hydrohalide acid.

15. The process of claim 6 wherein the compound of the formula RCOOM is a propionate, acetate or formate of an alkali metal.

16. The process of claim 15 wherein the alkali metal compound is sodium propionate.

17. The process of claim 2 wherein the nobel metal of the complex is noble and the soluble noble metal salt is a soluble palladium salt.

18. The process of claim 2 wherein the noble metal of the complex is platinum and the noble metal salt is a soluble platinum salt.

19. The process of claim 2 wherein the stannous halide is of the formula:

$$SnX_2$$

wherein X is a halogen atom having an atomic number in the range of 17–35 inclusive.

20. The process of claim 19 wherein the stannous halide is stannous chloride.

21. The process of claim 3 wherein the electrolessly metal plated surface is electroplated with a desired metal.

22. The process of claim 2 wherein the Lewis base is methanol, the noble metal salt is palladium chloride, the stannous halide is stannous chloride and the hydrohalide acid is hydrochloric acid.

23. The process of claim 3 wherein the soluble Lewis base-modified noble metal-tin halide complex is a 1-4C alkanol-modified noble metal-tin halide complex obtained by introducing a hydro-halide acid, water and a 1-4C alkanol into a reaction zone, supplying to the reaction zone a solution of an acid-soluble salt of the noble metal in a hydrohalide acid, mixing the thus-obtained mixture in the reaction zone at a temperature in the range of about 90°F. to about 130°F., adding to the thus-obtained mixture a solution containing a hydro-halide acid and a stannous halide, and holding the resulting mixture for a period of at least about 2 days and sufficient to obtain a catalytically effective solution containing the soluble Lewis base-modified noble metaltin halide complex, the stannous halide being added in excess of the amount required to reduce the noble metal salt to zero valent noble metal, the Lewis base being present in the reaction mixture at the outset of a redox reaction between the stannous halide and novel metal salt to prevent precipitation of zero valent noble metal and formation of a colloidal system, and the Lewis base being added in amount sufficient to obtain the soluble complex, the catalyst solution having a pH less than 1.

24. The process of claim 23 wherein the hydrohalide acid-and stannous halide-containing solution added to the thus-obtained mixture also contains a 1-4C alkanol.

25. The process of claim 24 wherein the alkanol is a 1-3C alkanol.

26. The process of claim 25 wherein the alkanol is methanol.

27. The process of claim 26 wherein prior to the holding step, the liquid mixture obtained by adding to the thus-obtained mixture the hydro-halide acid-and stannous halide-containing solution also containing the 1-3C alkanol is mixed for about 2-3 hours at a temperature in the range of about 90°F. to about 130°F., followed by separately adding to the resulting mixture a solution of a soluble stannous halide in a hydro-halide acid and another solution of a propionate, acetate for formate of an alkali metal in a 3–4 hours at a temperature in the range of about 90°F. to about 130°F., and separately adding to the resulting mixture an aqueous solution containing a propionate, acetate for formate of an alkali metal, a hydrohalide acid, and a stannous halide.

28. The process of claim 27 wherein the 1-3C alkanol is methanol.

29. The process of claim 27 wherein the alkali metal compound is sodium propionate.

30. The process of claim 27 wherein the mixing of each mixture is at a temperature in the range of about 100°F. to about 120°F.

31. The process of claim 30 wherein the hydrohalide acid is hydrochloric acid, the noble metal salt is palladium chloride, the tin halide is stannous chloride, and the alkali metal compound is sodium propionate and the mixture held for a period of at least about 5–6 days and sufficient to obtain the soluble complex.

* * * * *

(5/69)

CERTIFICATE OF CORRECTION

Patent No. 3,874,897 Dated April 1, 1975

Inventor(s) Earl Joseph Fadgen and Edward Basil Saubestre

It is certified that error appears in the above-identified patent and that said Letters Patent are hereby corrected as shown below:

Col. 1, line 37, "substrates" should read --systems--. Col.2, line 63, a comma should be inserted after "reduction" and before "plating". Col. 3, line 7, "and" should be inserted after "base," and before "a"; line 34, "length" should read --lengthy--. Col.4, line 15, "metaltin" should read --metal-tin--; line 47, "dragged n" should read --"dragged in"--; line 59, "ticlefree" should read --ticle-free--. Col. 6, line 3, "basemodified" should read --base-modified--. Col. 8, penultimate line, "more" should be deleted. Col. 9, line 45, "metalstannous" should read --metal-stannous--. Col. 10, line 36, "mixtures" should read --mixture--; line 66, "oridinarily" should read --ordinarily--. Col. 11, line 6, "at" should read --a--; line 35, "dilutue" should read --dilute--; line 40, --solution-- should be inserted after "post-activation" and before "assures". Col. 14, line 9, "-tin chloride" should read --tin bromide--. Col. 17, line 34, a hyphen should be inserted after "$H_2SO_4$" and before "containing". Col. 20, line 54, --1-- should be inserted after "together" and before "part". Col.22, line 28, "n" should read --in--; line 30, "i" should be deleted; line 30, the comma should be deleted after "100%" and before "of"; line 33, "35" should be changed to --25-- in the Example heading. Col. 23, line 35, "-tin" should be inserted after "palladium" and before "halide"; line 35, "NCl" should be changed to --HCl--. Col.24, lines 10 and 12, change "nobel" to --noble-- wherever appearing in each line; line 60, "abut" should be deleted; line 62, "1" should read --2--. Col. 25, line 29, "10" should read --12--; line 46, "noble" should read --palladium--. Col. 26, line 17, "altin" should read --al-tin--; line 21, "novel" should read --noble--; line 43, "for" should read --or--; line 44, the language --1-3C alkanol, mixing the thus-obtained mixture for about-- should be inserted after "a" and before "3-4"; line 47, "for" should read --or--.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*